(12) United States Patent
Dimperio et al.

(10) Patent No.: US 10,743,177 B2
(45) Date of Patent: Aug. 11, 2020

(54) METHOD AND APPARATUS TO PROVIDE MOBILE INTELLIGENCE

(71) Applicant: Syniverse Technologies, LLC, Tampa, FL (US)

(72) Inventors: Michael J. Dimperio, Longwood, FL (US); John Phillip Wick, Jr., Valrico, FL (US); Robert Wayne Boucher, Dade City, FL (US); Scott Andrew Irwin, Apopka, FL (US); John Greer Moore, Lake Mary, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 13/899,406

(22) Filed: May 21, 2013

(65) Prior Publication Data
US 2014/0349610 A1    Nov. 27, 2014

(51) Int. Cl.
*H04W 12/02*    (2009.01)
*H04L 29/06*    (2006.01)
(Continued)

(52) U.S. Cl.
CPC ........ *H04W 12/02* (2013.01); *G06Q 20/3224* (2013.01); *G06Q 20/4016* (2013.01); *H04L 63/0853* (2013.01); *H04L 63/107* (2013.01)

(58) Field of Classification Search
CPC ...... H04W 12/06; H04W 12/02; H04L 63/08; H04L 63/0853; H04L 63/107; G06Q 20/4016; G06Q 20/3224
See application file for complete search history.

(56) References Cited

U.S. PATENT DOCUMENTS

| 7,818,000 B2 * | 10/2010 | Lin | ........................ H04W 48/18 455/433 |
| 8,078,538 B1 * | 12/2011 | Buch | ...................... G06Q 20/10 455/10 |

(Continued)

FOREIGN PATENT DOCUMENTS

| KR | 20090059404 A | 6/2009 |
| KR | 20090063122 A | 6/2009 |

(Continued)

OTHER PUBLICATIONS

"Amdocs Showcases Full Range of Solutions and Services to Help Service Providers Unlock the Value of Big Data Analytics," <www.prnewswire.com/news-releases/amdocs-showcases-full-range-of-solutions-and-services-to-help-service-providers-unlock-the-value-of-big-data-analytics-212287161.html>, Accessed Jul. 15, 2013.

(Continued)

*Primary Examiner* — Steven S Kelley
(74) *Attorney, Agent, or Firm* — Andriy Lytvyn; Smith & Hopen, P.A.

(57) ABSTRACT

A method of utilizing mobile communication roaming data is described. The method receives a roaming data authorization from a user to allow using roaming data related to the user. The method receives roaming data related to the user from a set of mobile network operators. The method receives an information request related to the user. The method performs an analysis on the roaming data related to the user to retrieve the requested information. The method then sends a response containing the requested information.

16 Claims, 9 Drawing Sheets

(51) Int. Cl.
    *G06Q 20/40* (2012.01)
    *G06Q 20/32* (2012.01)

(56) References Cited

U.S. PATENT DOCUMENTS

| | | | |
|---|---|---|---|
| 8,116,731 B2 | 2/2012 | Buhrmann et al. | |
| 8,280,348 B2 | 10/2012 | Snyder et al. | |
| 8,315,610 B2 | 11/2012 | Hasemann | |
| 8,374,634 B2 | 2/2013 | Dankar et al. | |
| 8,559,944 B2 | 10/2013 | Ophir et al. | |
| 10,194,005 B2 * | 1/2019 | Virieux | H04L 69/22 |
| 10,475,020 B2 * | 11/2019 | Kaufman | G06Q 20/4016 |
| 2002/0090943 A1 * | 7/2002 | Kwon | 455/433 |
| 2006/0205434 A1 * | 9/2006 | Tom et al. | 455/558 |
| 2007/0202848 A1 * | 8/2007 | Ishikawa et al. | 455/411 |
| 2009/0204815 A1 | 8/2009 | Dennis et al. | |
| 2010/0035636 A1 * | 2/2010 | Enzmann | H04L 63/101 455/456.5 |
| 2010/0085947 A1 * | 4/2010 | Ringland et al. | 370/338 |
| 2010/0100519 A1 | 4/2010 | Aaron et al. | |
| 2010/0273504 A1 * | 10/2010 | Bull et al. | 455/456.1 |
| 2010/0281388 A1 | 11/2010 | Kane et al. | |
| 2011/0009132 A1 * | 1/2011 | Skarby et al. | 455/456.5 |
| 2011/0154447 A1 | 6/2011 | Dennis et al. | |
| 2011/0202407 A1 | 8/2011 | Buhrmann et al. | |
| 2011/0208601 A1 | 8/2011 | Ferguson et al. | |
| 2012/0094597 A1 * | 4/2012 | Tysowski | G06Q 10/10 455/41.1 |
| 2012/0130898 A1 | 5/2012 | Snyder et al. | |
| 2012/0131121 A1 | 5/2012 | Snyder et al. | |
| 2012/0144498 A1 | 6/2012 | Buhrmann et al. | |
| 2012/0149387 A1 * | 6/2012 | Rawat et al. | 455/456.1 |
| 2012/0196568 A1 * | 8/2012 | Bakshi | G06Q 20/40 455/411 |
| 2012/0244835 A1 * | 9/2012 | Rappaport | G06Q 10/067 455/406 |
| 2012/0253957 A1 | 10/2012 | Bakshi | |
| 2012/0302209 A1 | 11/2012 | Snyder et al. | |
| 2013/0030934 A1 | 1/2013 | Bakshi et al. | |
| 2013/0046626 A1 * | 2/2013 | Grigg et al. | 705/14.53 |
| 2013/0054367 A1 * | 2/2013 | Grigg et al. | 705/14.58 |
| 2013/0117155 A1 * | 5/2013 | Glasgo | G06Q 30/00 705/26.35 |
| 2013/0132568 A1 | 5/2013 | Dankar et al. | |
| 2013/0182554 A1 | 7/2013 | Poon et al. | |
| 2013/0197998 A1 | 8/2013 | Buhrmann et al. | |
| 2013/0262311 A1 | 10/2013 | Buhrmann et al. | |
| 2013/0333032 A1 | 12/2013 | Delatorre et al. | |
| 2014/0242938 A1 * | 8/2014 | Heen | H04W 48/06 455/405 |
| 2016/0182412 A1 * | 6/2016 | Kabbes | G06F 16/273 709/206 |

FOREIGN PATENT DOCUMENTS

| | | |
|---|---|---|
| KR | 20100053706 A | 5/2010 |
| KR | 20110100804 A | 9/2011 |
| WO | 2010088086 A1 | 8/2010 |
| WO | 2010088298 A1 | 8/2010 |
| WO | 2012009557 A2 | 1/2012 |

OTHER PUBLICATIONS

PCT/US2014/038865, Internation Search Report, dated Sep. 24, 2014, 3 pages.
PCT/US2014/038865, Written Opinion of the International Search Authority, dated Sep. 24, 2014, 6 pages.
PCT/US2014/038865, International Preliminary Report on Patentability, dated Nov. 24, 2015, 7 pages.

* cited by examiner

METHOD AND APPARATUS TO PROVIDE
MOBILE INTELLIGENCE

FIELD

The present invention relates to network data, and more particularly to a method and apparatus to utilize cellular network data.

BACKGROUND

Credit card providers often monitor where a credit card is used. For example, if you live in California, and your credit card is used, without notification, in Belize, your card provider may assume that the transaction was fraudulent, and not allow the card use. This can be helpful when it is a fraudulent transaction, but can be rather disconcerting when a credit card suddenly stops working while a user is traveling abroad. There is a need for a reliable and accurate method to validate a credit card transaction through the location of the credit card user.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
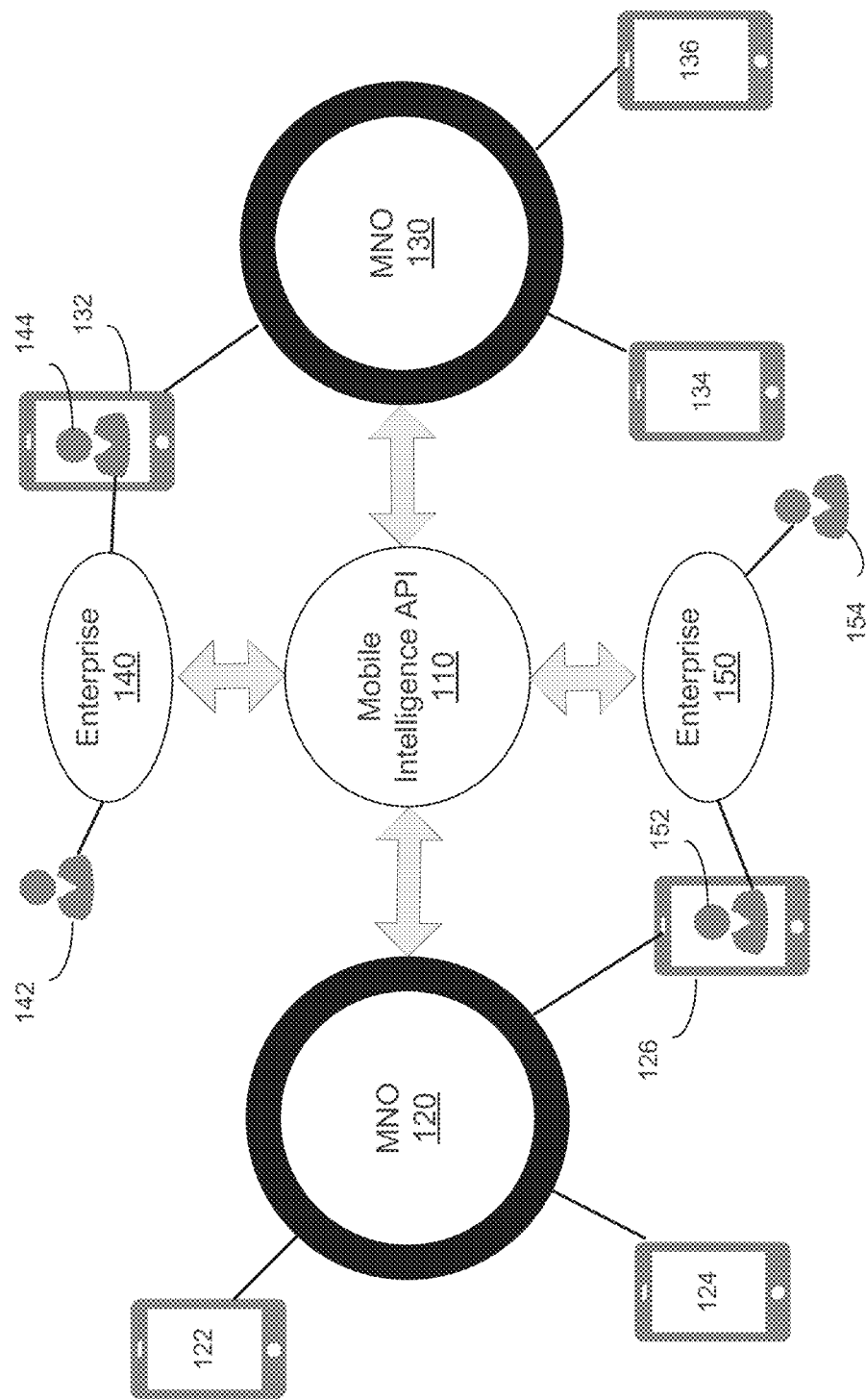
FIG. 1 is a network diagram of one embodiment of the system.

When a cellular service customer travels to a location that is different from the home location where the customer registered for cellular service, roaming service ensure that the mobile device of the customer is kept connected to the network, without losing the connection. Roaming gives a cellular customer the ability to automatically make and receive voice calls, send and receive data, or access other services, including home data services, when travelling outside the geographical coverage area of the home network, by means of using a visited network. An interoperation provider makes it possible for disparate technologies and standards to interoperate. This enables mobile network operators to provide their subscribers with access to voice calls, data, and other services as subscribers move across mobile networks around the world.

In order to provide roaming service to a cellular subscriber, the mobile network provider and its roaming partners have to monitor the location of the mobile device of the subscriber. This location information enables the service providers to engage an appropriate roaming partner to provide mobile service to ensure uninterrupted services to roaming subscribers.

The roaming related location information obtained by cellular service providers is reliable, difficult to spoof, and is updated in real-time. In an era of wide spread use of mobile communication devices, the roaming related location information provides a unique picture of the whereabouts of those people who travel outside of their home mobile service networks.

The present invention, in one embodiment, utilizes a trusted third party broker of subscriber roaming status to provide, with the explicit consent of the subscriber, relevant information about a subscriber in the context of their mobile communication services. The relevant information may include subscriber Information (name, home address, account type, IMSI, MSISDN, MDN, etc.), location Information (current and historical), device Information (make, model, capabilities, etc.), and network Information (type, provider, performance, capabilities, etc.). The information is network independent. For example, the information can come from several different types of mobile networks, including but not limited to GSM, CDMA, LTE, and EDGE.

In one embodiment, the system is a multi-lateral system that supports many to many relationships. The system utilizes the trusted third party broker to provide real-time detection of roaming using the mobile device registration. This is extremely difficult to fool and provides visibility into historical user behavior that includes services used, countries visited, as well as mobile network operator (MNO) networks and mobile devices used.

In one embodiment, since the use of the system relies on third party data, e.g. the data from various roaming partners, an industry standard protocol may be set up to share this information. The data may be shared, in one embodiment, with a many-to-many privacy opt-in process. In one embodiment, the system may also utilize data provided for settlement services. An intercarrier system, such as the system provided by SYNIVERSE® enables collection of signaling and routing data. The servicing operators send their records to the inter-carrier management system to enable payment and interoperations. The intercarrier system's clearing/settlement services process these records. In one embodiment, the clearing and settlement records records are available in real-time, the signaling and routing information is available in real-time, clearing and settlement are post call information and is available within one to five days.

When the mobile device registers in a new location, the updated home location register (HLR) information is shared with the intercarrier management system. Unlike a GPS signal, which can easily be spoofed by a bad actor, the HLR data is much more difficult to spoof.

The real-time detection may be used for fraud mitigation, by automatically identifying the country visited and the service network operator, thus validating the point of service locations of financial transactions. By associating the mobile telephone with a credit card or other financial transaction tool, the user of the credit card or other financial transaction tool can enjoy service without interruption or undue restrictions, while maintaining benefits of the location-based-validity verification. In one embodiment, the system uses only roaming data to provide location identification services. In another embodiment, the system combines roaming data with other location identification methods (e.g., GPS, Assisted GPS, network triangulation, etc.) to enhance the accuracy and reliability of the identified location.

In addition to providing real-time financial validation, the system may also mine data to determine how often a mobile subscriber travels, and his or her general travel pattern. This data may be used to enable targeted marketing based on expected travel patterns. For example, an associated enterprise, such as AMAZON®, may look at typical purchases of a subscriber, and determine marketing campaign by being informed when the subscriber arrives at a new destination, or is due to travel. The system may also enable the provision of mobile ads through different media (push/SMS/MMS/email/other). The collection of historical information enables the building of a user profile, so that relevant recreation, activities, goods, or services may be advertised. In one embodiment, those promotions may be prepared for a subsequent visit. For example, a user is identified as purchasing a whale watching tour on a trip to San Francisco. On a subsequent visit, as the user is arriving in San Francisco, discount tickets to a whale watching tour may be provided as an offer.

In one embodiment, the system includes a strong privacy framework. Each subscriber opts in with his or her mobile operator as well as with one or more financial transaction tools, and targeting enterprises.

The following detailed description of embodiments of the invention make reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

FIG. 1 is a network diagram of one embodiment of the system. Specifically, this figure illustrates a mobile intelligence application programming interface (API) 110 collects data from multiple mobile network operators and multiple enterprises and provides intelligence to the mobile network operators and the enterprises. As shown in the figure, the mobile intelligence API 110 collects data with several mobile network operators represented by operators 120 and 130, and several enterprises represented by enterprises 140 and 150.

Each mobile network operator serves multiple mobile devices. For example, mobile network operator 120 serves mobile devices 122, 124, and 126, and mobile network operator 130 serves mobile devices 132, 134, and 136. Each enterprise serves multiple customers. For example, enterprise 140 serves customers 142 and 144, and enterprise 150 serves customers 152 and 154. Some enterprise customers are also mobile subscribers. For example, the mobile device 126 of customer 152 of the enterprise 150 is served by the mobile network operator 120; the mobile device 132 of customer 144 of the enterprise 140 is served by the mobile network operator 130. Of course while only a few devices and customers are shown, this is merely for illustrative purposes. Furthermore, a single customer may be the customer of both enterprise 140 and enterprise 150.

A mobile network operator (also known as a wireless service provider, wireless carrier, cellular company, or mobile network carrier) is a provider of wireless communications services. A mobile network operator provides wireless communications services to individual subscribers using mobile devices. For example, the mobile network operator 120 provides wireless communications services to subscribers using the mobile devices 122, 124, 126.

Some mobile network operators have roaming agreements with each other. Roaming agreements stipulate the performance levels and monetary aspects enabling a mobile network operator to provide services to a subscriber of another mobile network operator. For example, in the illustration shown, the mobile network operator 120 may have a roaming agreement with the mobile network operator 130. Therefore, the subscribers of the mobile network operator 120 can utilize the cellular network of the mobile network operator 130. This enables better coverage for the subscribers of mobile network operator 120, enabling the operator to provide cellular connectivity in locations without building out its own infrastructure.

An enterprise is an entity that provides goods or services to customers. The services may include financial services, such as clearing credit card transactions.

In one embodiment, the mobile intelligence API 110 is a portal of a trusted third party intermediary that provides cohesiveness and simplicity to an interconnected and interdependent mobile ecosystem. In one embodiment, the mobile intelligence API 110 is a general-purpose information service, common for all mobile network operators, enterprises, and other entities, albeit with very advanced and proactive capabilities. It provides a way for operators to monetize their data and for enterprises to get the data they need to enhance their customer experience.

In one embodiment, the mobile intelligence API 110 provides business services, tailored for particular vertical markets or even an individual entity, and built to automate specific business functions and solve specific business problems.

In one embodiment, the mobile intelligence API 110 operates in an on-demand mode. In this embodiment, an enterprise 140, 150 sends a request related to a customer to the mobile intelligence API 110 and the mobile intelligence API 110 responds with the most current information available for that customer.

In another embodiment, the mobile intelligence API 110 operates in a proactive mode. In this embodiment, enterprises use the mobile intelligence API 110 to set up policies for alerting. When the policy's trigger criteria are met for a customer, the enterprise is alerted in real time with the most current information available for that customer. This avoids the need for enterprises to continuously make requests to the mobile intelligence API 110 to maintain up-to-date awareness of important customer data. In one embodiment, these policies can be set up with effective dates and expiration dates, or can be turned on or off manually.

The proactive mode would allow, for example, an enterprise to say "Let me know if any mobile subscriber travels to Western Europe" or "Let me know if a mobile subscriber opted-out from the home MNO" or "Let me know if a mobile subscriber comes with 1 Km of Times Square" or "Let me know if this subscriber registers on a Telefonica group network." In one embodiment, for large groups of customers, the API 110 may send out batch reports of customers that meet certain criteria, e.g. "have previously traveled to Europe, and are going to be in Europe during the month of May."

The mobile intelligence API 110 analyzes the collected data and provides advanced, user-friendly intelligent solutions to mobile network operators and/or enterprises. The intelligent solutions are the result of real-time analysis and complex intelligence/analytics. In one embodiment, the mobile intelligence API 110 provides real time detection of roaming with visibility to historical usage behavior (services used, countries visited, MNO network used, mobile device used, etc.), fraud mitigation, and third party data. The mobile intelligence API 110 also facilitates many-to-many privacy opt-in process and settlement services. In one embodiment, the mobile intelligence API 110 is a stand-alone system, while in another embodiment the mobile intelligence API 110 is part of a system for managing business operations and customer relations.

While the description here addresses subscribers and customers separately, due to their separate opt-in and relationships, it should be understood that the customer and subscriber should be the same individual. Only those who consent to their data being shared as subscribers to an MNO, and consent to their data being used as consumers of an enterprise, can take advantage of the present system.

Figure 2:
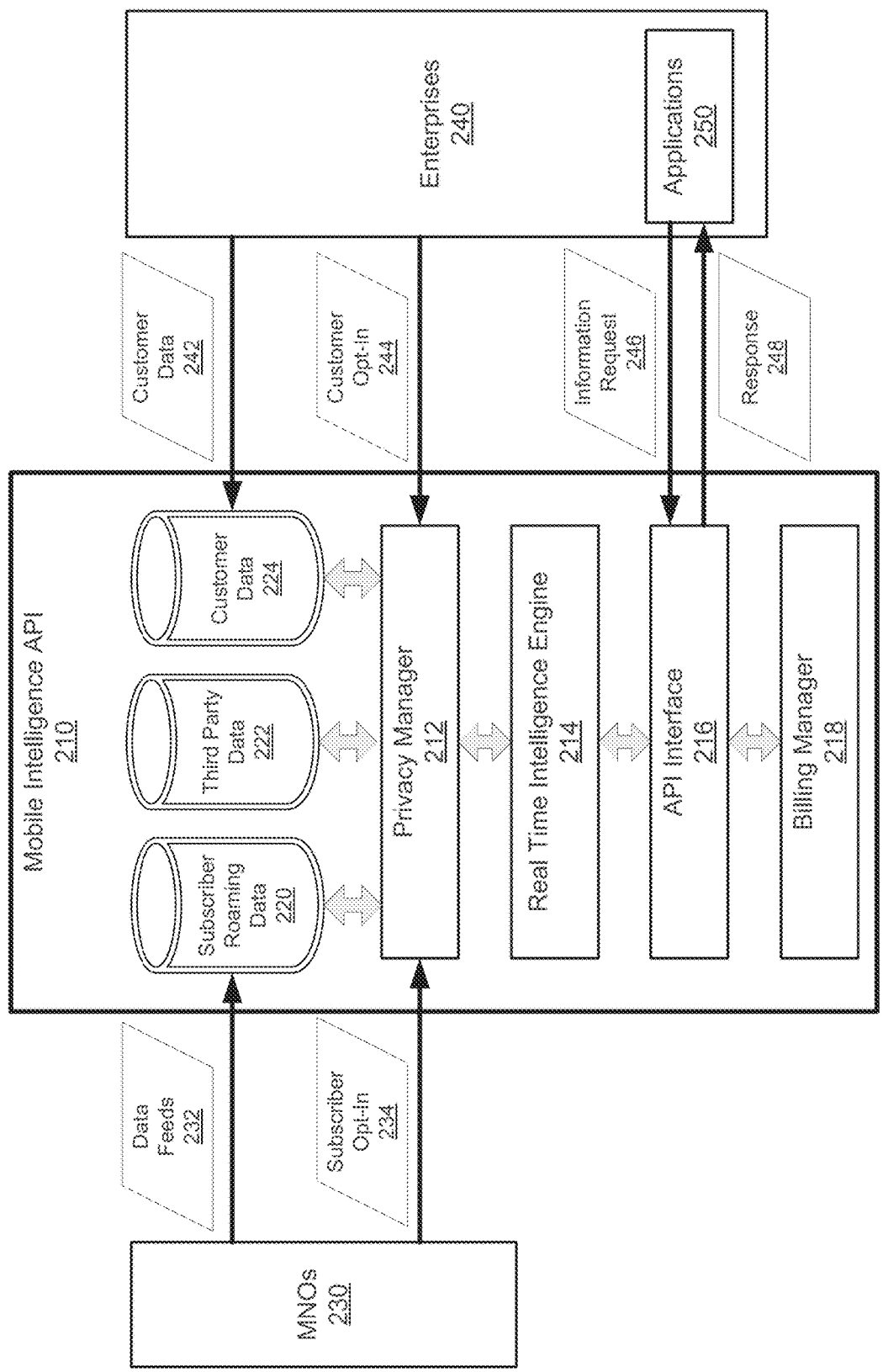
FIG. 2 is a block diagram of one embodiment of a mobile intelligence API.

FIG. 2 is a block diagram of one embodiment of a mobile intelligence API 210. As illustrated, the mobile intelligence API 210 receives data feeds 232 and subscriber opt-in 234 from the mobile network operators 230. The mobile intelligence API 210 also receives customer data 242 and customer opt-in 244 from the enterprises 240. The mobile intelligence API 210 receives information/intelligence request 246 from enterprise applications 250 and responds with information/intelligence 248.

In one embodiment, the mobile intelligence API 210 includes a privacy manager 212, a real-time intelligence engine 214, an API interface 216, and a billing manager 218. The mobile intelligence API 210 in one embodiment also includes subscriber roaming data 220, third party data 222, and customer data 224. The data may be stored in a database, a plurality of separate databases, or another data structure.

The subscriber roaming data 220 receives and stores mobile subscriber related data feeds 232 from the mobile network operators 230. In one embodiment, the data feeds 232 include signaling data and DCH data, e.g., phone register and home location register (HLR) registration information. The information stored as subscriber roaming data 220 provides location information and past travel history information. The information in the subscriber roaming data 220 also provides historical usage behavior of a subscriber, e.g., services used by the subscriber, countries visited by the subscriber, MNO networks used by the subscriber, mobile devices used by the subscriber, etc.

The customer data 224 receives and stores enterprise customer related customer data 242 received from the enterprises 240. In one embodiment, the customer data 242 includes customer purchase profile, e.g., purchase preference, purchase frequency, average transaction amount, etc. The third party data storage 222 receives and stores information about the customer/subscriber from third party entities that are neither mobile network operators nor enterprises.

The privacy manager 212 manages the privacy of mobile subscribers and enterprise customers. Specifically, the privacy manager 212 makes sure that only data authorized by the subscriber/customer is used to provide mobile intelligence. The privacy manager 212 receives subscriber opt-in 234 from the mobile network operators 230 and customer opt-in 244 from the enterprises 240, in one embodiment. In another embodiment, the mobile API 210 may receive customer/subscriber opt-in directly. In one embodiment, the subscriber and customer opt-in come from the customer relationship management (CRM) system of the mobile network operators and enterprises, respectively. The subscriber opt-in 234 and the customer opt-in 244 grant permissions by the subscribers and the customers to the mobile intelligence API 210 to use the subscriber/customer data.

In one embodiment, once a subscriber or customer opt-in, his or her related subscriber roaming data or customer data is received and stored by the mobile intelligence API 210. In another embodiment, a subscriber or customer data is not stored by the mobile intelligence API 210. Instead, the mobile intelligence API 210 requests the data from the mobile network operators 230 or enterprises 240 when the data is needed for providing intelligence.

The real-time intelligence engine 214 retrieves data from the data storage and performs analysis on the retrieved data to garner mobile intelligence in real-time. In one embodiment, the real-time intelligence engine 214 derives mobile intelligence in response to receiving a request from the API interface 216. The real-time intelligence engine 214 will be described in detail below in FIG. 3.

The API interface 216 enables the enterprise applications 250 to interact with the API, and send information/intelligence requests 246. The interface 216 returns information/intelligence 248 in response to the request. In one embodiment, the API interface 216 forwards the received request to the real-time intelligence engine 214 in order to obtain the requested information/intelligence. The billing manager 218 manages the billing for providing mobile intelligence service.

Figure 3:
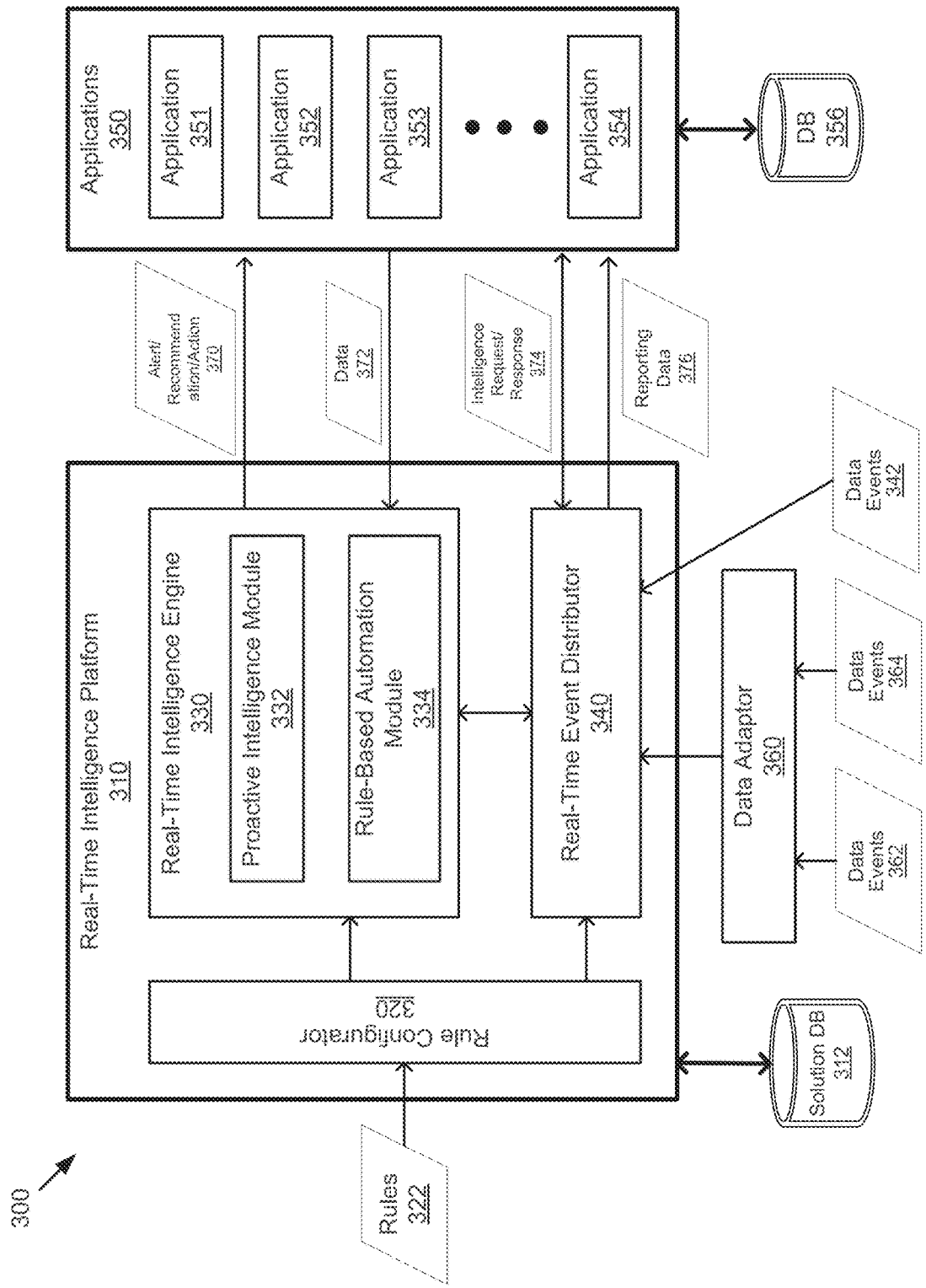
FIG. 3 is a block diagram of one embodiment of a real-time intelligence system.

FIG. 3 is a block diagram of one embodiment of a real-time intelligence system 300. The components of a single platform for providing advanced, user-friendly solutions for real-time analysis and utilization of mobile network data are shown. In one embodiment, the real-time intelligence system 300 is a stand-alone system, while in another embodiment the real-time intelligence system 300 is part of a system for managing mobile operations and customer relations. As shown in the figure, the real-time intelligence system 300 includes two major components: a real-time intelligence platform 310 and a group of applications 350.

The real-time intelligence platform 310 is a configurable platform to support real-time decision making. The real-time intelligence platform 310 leverages existing mobile network data and supports the use of external data sources for real-time decision making. The real-time intelligence platform 310, in one embodiment, collects data from a variety of sources and provides intelligence to a variety of applications. In one embodiment, the real-time intelligence platform 310 includes a rule configurator 320, a real-time intelligence engine 330, and a real-time event distributor 340. The real-time intelligence platform 310 accesses a solution database 312.

The rule configurator 320 receives and/or generates rules to configure the real-time intelligence engine 330 and the real-time event distributor 340. In one embodiment, the rule configurator 320 receives a set of rules 322 from a user with a proper level of authority. In one embodiment, the rule configurator 320 generates the rules by analyzing the historical data stored in the solution database 312. In one embodiment, the rules 322 reflect the rules set up by one or more enterprises. In another embodiment, the rules 322 reflect a trend identified based on an analysis of the historical network data.

The real-time event distributor 340 receives data events 362, 364 from a data adaptor 360 in one embodiment. In another embodiment, instead of or in conjunction with receiving data events 362, 364 from the data adaptor 360, the real-time event distributor 340 receives data events 342 directly. The real-time event distributor 340 forwards the received data events to the real-time intelligence engine 330 for analysis. In one embodiment, the real-time event distributor 340 sends reporting data 376 to the applications 350 to report the data events received.

The data adaptor 360 collects data events from different sources and channels. For example and in one embodiment, the data events includes signaling, fraud control, messaging, clearing, number portability, location acquisition services, and other types of messaging from network operators, enterprises, and third-party systems (e.g., Wi-Fi systems). In one embodiment, the data events include all data related to the enablement of roaming activities. In one embodiment, the data adaptor 360 processes the collected data events before sending them to the real-time event distributor 340. In one embodiment, the data adaptor 360 converts the collected data events to a universal format, such as XML, from the various formats in which they are received. In one embodiment, the data adaptor 360 determines data correlations based on the collected data events. In one embodiment, the data adaptor 360 normalizes the collected data events, e.g., adjusting values measured on different scales to a notionally common scale.

The real-time intelligence engine 330 is an event based business rules engine. The real-time intelligence engine 330 is configurable to perform real-time decision making. The real-time intelligence engine 330 analyzes data from various sources and channels to determine recommendations and communicate with enterprises. In one embodiment, this analysis may be in real-time or near real-time. The real-time intelligence engine 330, in one embodiment, includes a proactive intelligence module 332 and a rule-based automation module 334. The proactive intelligence module 332 identifies patterns in the data and triggers proactive actions in response to the identified patterns. The rule-based automation module 334 detects data events that satisfy predefined rules and perform actions automatically.

The applications 350 include one or more application programs 351-354 associated with one or more enterprises that may request data or receive data from the platform 310. The applications 350, in one embodiment, access a database 356 to retrieve information. In one embodiment, there are separate databases for different application programs. In another embodiment, several application programs share the same database. In one embodiment, the platform 310 sends information to the applications 350, instead of or in addition to the applications 350 pulling data from the platform 310.

The applications 350 send information or intelligence requests 374 to the real-time intelligence platform 310. In one embodiment, an application 350 sends the request 374 to the real-time event distributor 340, which forwards the request to the real-time intelligence engine 330. In that embodiment, the real-time intelligence engine 330 analyzes data stored in the solution database 312 and formulates a response. The real-time intelligence engine 330 then sends the response 374 to the application 350, either directly or through the real-time event distributor 340. In one embodiment, the application 350 sends the requests to the real-time intelligence engine 330 directly and receives the response from the real-time intelligence engine 330. In one embodiment, the real-time intelligence engine 330 sends alerts, recommendations, or actions 370 to an application 350 proactively or in response to a request. In one embodiment, the applications 350 send application data 372 to the real-time intelligence engine 330 to facilitate data analysis.

In one embodiment, an authorized employee inputs a set of rules 322 through the rule configurator 320 to configure the real-time intelligence engine 330. The data adaptor 360 collects data events from a variety of sources, processes the data events, and sends the data events to the real-time event distributor 340, which forwards the data events to the real-time intelligence engine 330. The real-time intelligence engine 330 processes the data events to determine if any of the data events trigger a rule. If a rule is triggered, the real-time intelligence engine 330 sends an alert or a recommended action to the applications 350 to react to the data event proactively. In one embodiment, real-time event distributor 340 may batch up data sets that match rules, and send batched data periodically to the appropriate application 350.

Figure 4:
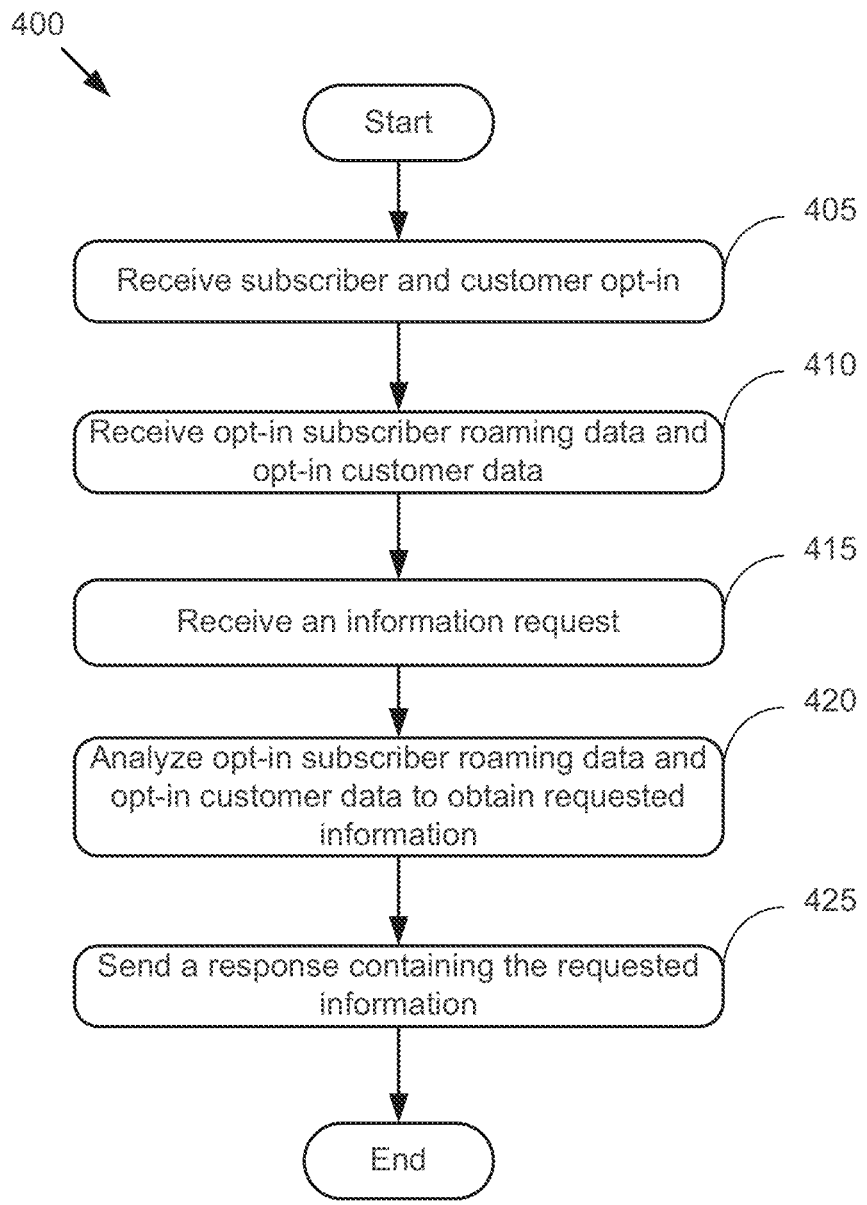
FIG. 4 is an overview flowchart of one embodiment of utilizing the roaming data.

FIG. 4 is an overview flowchart of one embodiment of utilizing the roaming data. Process 400 analyzes received roaming and customer data to provide mobile intelligence. The process 400 begins by receiving (at block 405) subscriber and customer opt-in. In one embodiment, the privacy manager 212 receives the subscriber and customer opt-in, as described above in FIG. 2.

At block 410, the process 400 receives opted-in subscriber roaming data and opted-in customer data. In one embodiment, the opted-in subscriber and customer data are retrieved from data storage 220 and 224, as described above in FIG. 2. In another embodiment, the opted-in subscriber and customer data are retrieved from the mobile network operators and enterprises. The data includes roaming information, indicating a current location of an opted-in subscriber, in one embodiment. The data includes purchases or transactions between the enterprise and the opted-in customer, in one embodiment.

The process receives (at block 415) an information request. In one embodiment, the information request includes a request for the location of a roaming mobile subscriber. In another embodiment, the information request includes a request for opted-in customers that meet a set of requirements.

The process 400 analyzes (at block 420) the opted-in subscriber roaming data and the opted-in customer data to obtain requested information. In one embodiment, the real-time intelligence engine 214 performs the analysis on the opted-in subscriber roaming data and customer data, as described above in FIG. 2. In one embodiment, the process 400 analyzes signaling data (i.e., mobile registrations and registration updates) exchanged between the home MNO and serve MNO to determine the location of a particular mobile subscriber. In another embodiment, the process analyzes data clearinghouse (DCH) data to determine the past travel history information of a particular mobile subscriber.

At block 425, the process 400 sends a response to the request. In one embodiment, the response contains the location of a mobile subscriber. In another embodiment, the response contains a list of subscribers/customers that satisfy the set of requirements contained in the information request. The process 400 then ends.

One of ordinary skill in the art will recognize that the process 400 is a conceptual representation of the operations used to provide mobile intelligence. The specific operations of the process 400 may not be performed in the exact order shown and described. For example and in one embodiment, the process 400 receives information request before retrieving roaming data and customer data. The specific operations may not be performed in one continuous series of operations, and different specific operations may be performed in different embodiments. For example and in one embodiment, the process 400 performs the operation at block 420 automatically without receiving an information request, e.g., triggering a location alert when a mobile subscriber/consumer's mobile device registers in a country other than his/her home country. Furthermore, the process could be implemented using several sub-processes, or as part of a larger macro process. For instance, in some embodiments, the process 400 is performed by one or more software applications that execute on one or more computers.

Figure 5:
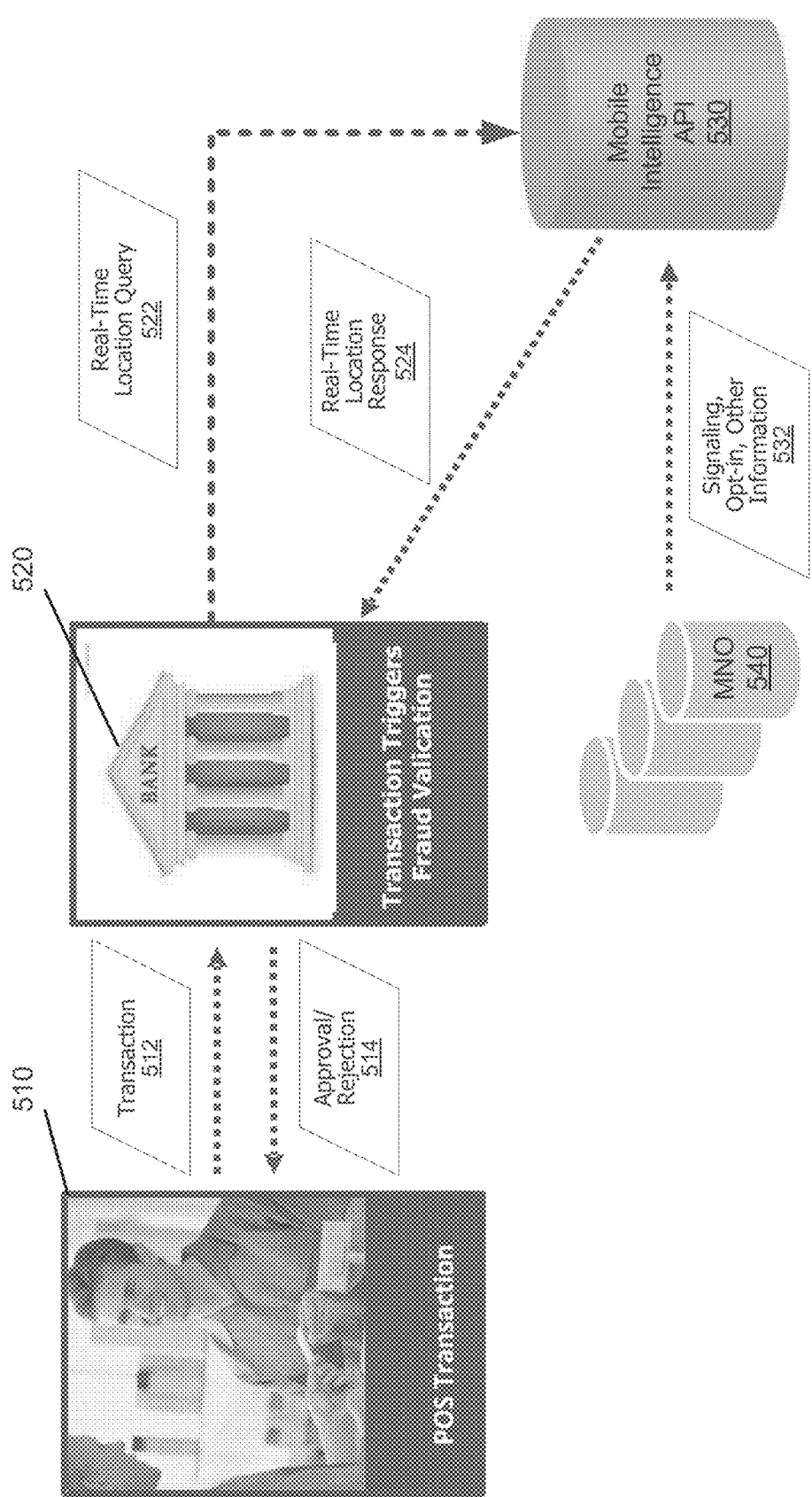
FIG. 5 is an illustration of one embodiment of using subscriber roaming data for fraud mitigation.

FIG. 5 is an illustration of one embodiment of using subscriber roaming data for fraud mitigation. The system describes using subscriber cellular network location data to validate the location of a customer who is conducting a financial transaction. The mobile network operator 540 sends data 532 of a subscriber to the mobile intelligence API 530. In one embodiment, this data is continuously updated by the MNO 540. In another embodiment, this data is sent upon request by the mobile intelligence API 530.

When the subscriber conducts a financial transaction, such as a credit card purchase at point of sale 510, the transaction 512 is sent to a financial institution 520 for processing. The financial institution 520, in this example, is the enterprise, and the enterprise customer has opted into this type of validation.

In order to validate the transaction, the financial institution 520 sends a real-time location query 522 to the mobile intelligence API 530. In one embodiment, in response to the request, the mobile intelligence API 530 performs an analysis on the received signaling data to determine the location of the subscriber. The mobile intelligence API 530 then sends a real-time location response 524 to the financial institution 520.

The financial institution 520 compares the location response 524 with the location of the point of sale 510. If the locations match, the transaction is validated and the financial institution 520 approves the transaction. Otherwise, the financial institution 520 denies the transaction, or triggers an alternative validation mechanism. The financial institution 520 sends a transaction approval/rejection message 514 to the point of sale 510 to notify its decision regarding the transaction.

Figure 6:
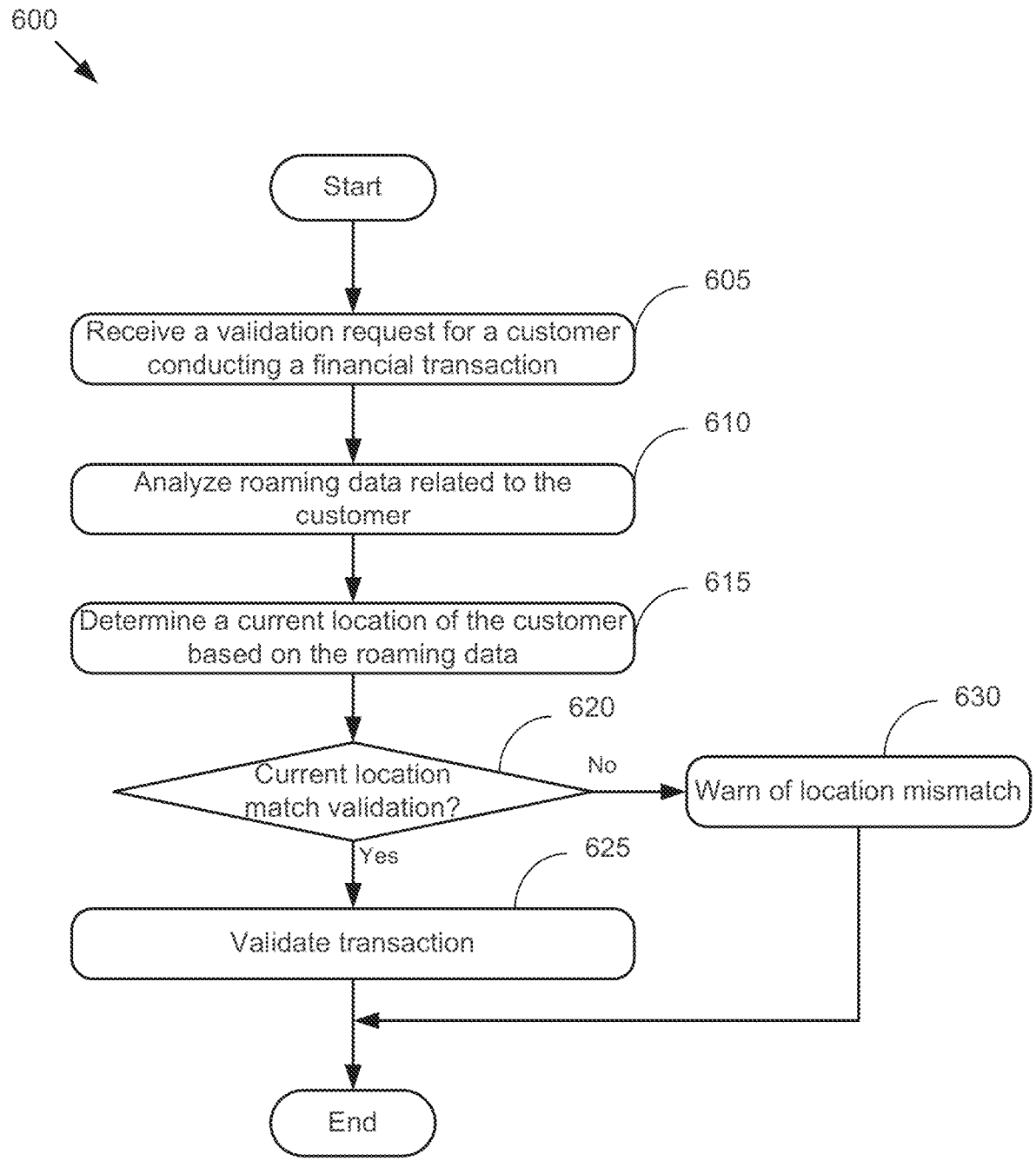
FIG. 6 is a flowchart of one embodiment of fraud mitigation for financial transactions.

FIG. 6 is a flowchart of one embodiment of fraud mitigation for financial transactions. Specifically, this figure describes a process 600 that validates the location of a customer who is conducting a financial transaction through the customer's roaming data. In one embodiment, the process 600 starts when an opted-in customer conducts a financial transaction. The process 600 begins by receiving (at block 605) a validation request for a customer conducting a financial transaction.

At block 610, the process 600 analyzes roaming data related to the customer. In one embodiment, a mobile intelligence API performs the analysis, as described above in FIG. 5. In one embodiment, the roaming data related to the customer is received from mobile network operators with the permission of the subscriber, who is also the customer. The process determines (at block 615) a current location of the customer based on the roaming data. In one embodiment, the process 600 determines the location of the customer through analyzing signaling data (i.e., mobile registrations and registration updates) exchanged between the home MNO and serve MNO. In one embodiment, the location data is sent to the financial institution. In one embodiment, latitude/longitude information is returned to the financial institution.

In one embodiment, the process 600 determines (at block 620) whether the determined current location matches the location of the validation request. In one embodiment, this comparison is performed by the financial institution. If the locations match, the process 600 validates (at block 625) the transaction. Otherwise, in one embodiment, the process sends (at block 630) a warning about the location mismatch. This enables the customer to utilize an alternative validation mechanism, such as a password, or call. In another embodiment, the transaction is canceled if the validation fails. The process 600 then ends.

One of ordinary skill in the art will recognize that the process 600 is a conceptual representation of the operations used to validate a financial transaction. The specific operations of the process 600 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 600 is performed by one or more software applications that execute on one or more computers.

Figure 7:
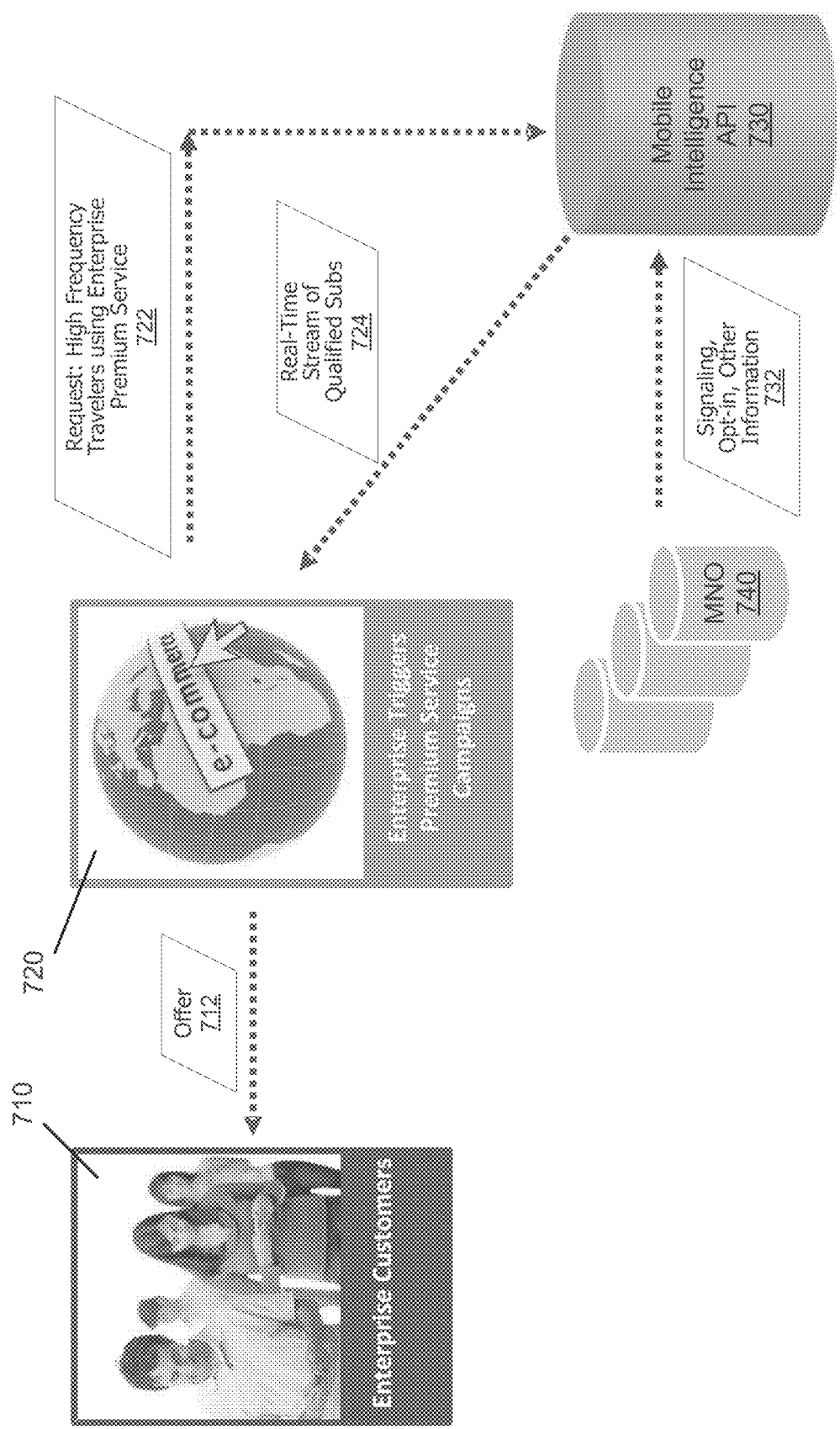
FIG. 7 is an illustration of one embodiment of ecommerce mobile contextual offers.

FIG. 7 is an illustration of one embodiment of using the mobile location data for ecommerce mobile contextual offers. In one embodiment, the mobile network operators 740 send data 732 of opted-in subscribers to the mobile intelligence API 730. In one embodiment, this data is sent continuously. In one embodiment, this data is sent as part of another transaction such as an interoperation functionality. In one embodiment, this data is sent as batch data periodically. In one embodiment, this data is sent in response to a request by the mobile intelligence API 730.

When an enterprise 720 wants to use a premium service campaign to send offers to target customers, the enterprise 720 sends a request 722 to the mobile intelligence API 730. For example, the request may be for a list of opted-in enterprise customers that are frequent travelers and are visiting a particular country.

In one embodiment, in response to the request, the mobile intelligence API 730 performs an analysis on the data to determine the travel and purchase history of the opted-in customers. In one embodiment, the mobile intelligence API also performs an analysis on the received signaling data to determine the current location of the subscribers. The mobile intelligence API 730 then sends a response 724 to the enterprise 720. The response 724, in one embodiment, includes a real-time stream of qualified customers—whose location history and purchasing history matches the enterprise's request and the locations of those customers. In another embodiment, the response 724 includes a grouping of a plurality of customers who qualify, sent as a batch.

The enterprise 720 in one embodiment can use the data to create offers 712 for one or more customer 710. The enterprise 720 can deliver the offers 712 to customers 710 through email, SMS, MMS, mobile application, onsite promotion, or another path. This enables an enterprise to target relevant subgroups of customers with special offers, based on actual historical location information, and purchase history.

Figure 8:
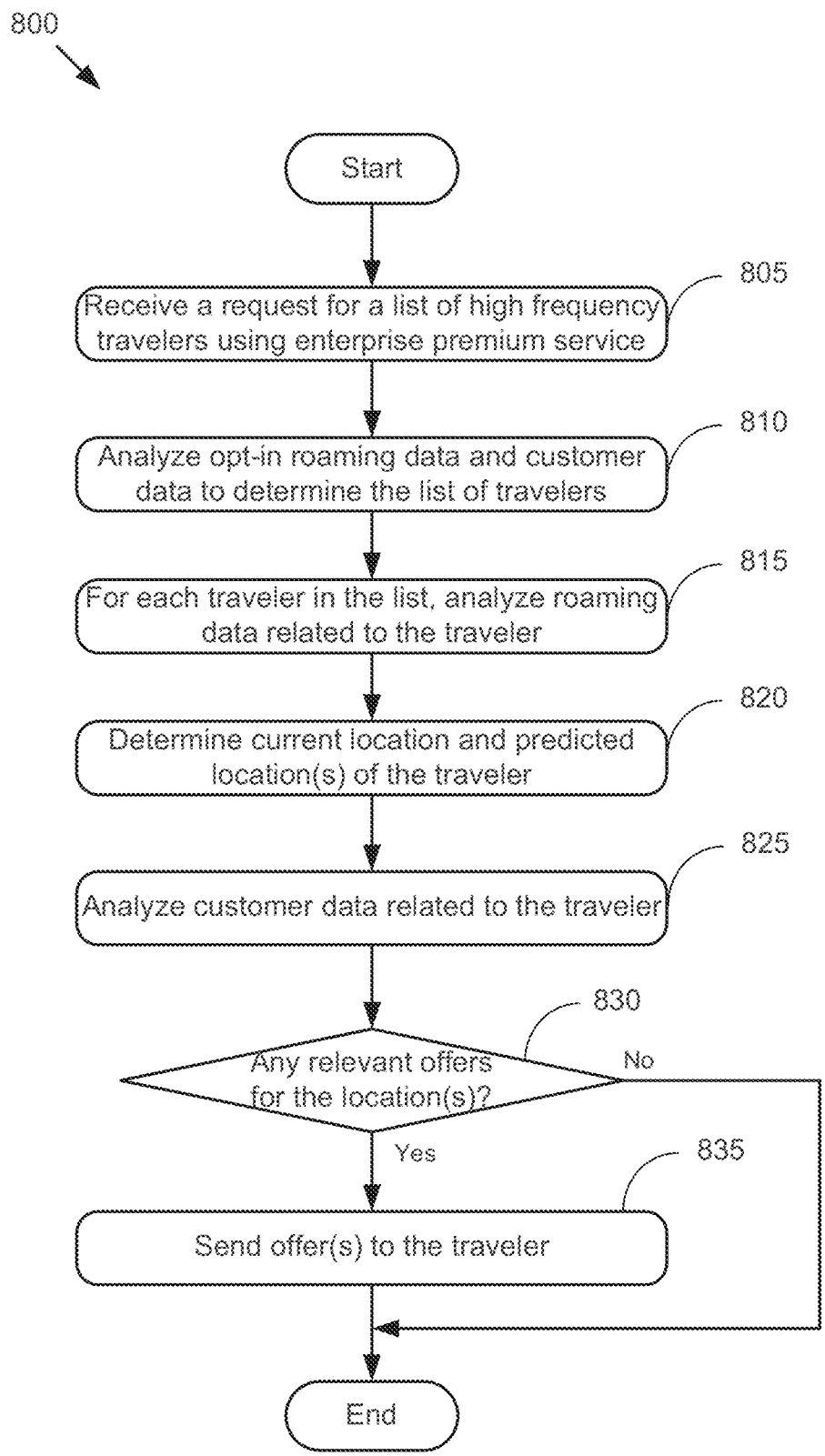
FIG. 8 is a flowchart of one embodiment of utilizing roaming data to provide relevant offers.

FIG. 8 is a flowchart of one embodiment of utilizing location data to provide relevant offers from one or more enterprises to opted-in customers. In one embodiment, the process 800 starts after an enterprise triggers a premium service campaign. As shown in the figure, the process 800 begins by receiving (at block 805) a request from an enterprise. The request may be general, such as a list of high frequency travelers using enterprise premium service, or more specific, such as customers who had previously purchased Wild Animal Park tickets and who will be in San Diego in May of this year.

At block 810, the process 800 analyzes opt-in location data and customer data to identify opted-in customers who meet the criteria. In one embodiment, in response to the received request, the process performs an analysis on the received DCH data to determine the travel history of the subscribers in order to determine the list of high frequency travelers. For each traveler in the list, the process 800 analyzes (at block 815) cellular location data related to the traveler. In one embodiment, the process 800 determines (at block 820) the current location and/or predicted locations of the traveler based on the analysis of roaming data. In one embodiment, the process determines the current location of the traveler by analyzing the cellular data related to the device associated with the subscriber.

At block 825, the process 800 analyzes the customer data related to the traveler. The customer data includes the history of interactions with the enterprise, such as prior purchases.

The process determines (at block 830) whether there are any customers that meet the criteria. If so, the customer information is returned to the enterprise.

The enterprise can then choose to send (at block 835) relevant offers to the traveler through email, SMS message, mobile application, onsite promotion, or other communication method. When there are no customers that meet the enterprise criteria, the process 800 ends.

One of ordinary skill in the art will recognize that the process 800 is a conceptual representation of the operations used to provide relevant offers to customers using roaming data. The specific operations of the process 800 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 800 is performed by one or more software applications that execute on one or more computers.

Many of the methods of the disclosed embodiments may be performed with a digital processing system, such as a conventional, general-purpose computer system. Special purpose computers, which are designed or programmed to perform only one function, may also be used.

Figure 9:
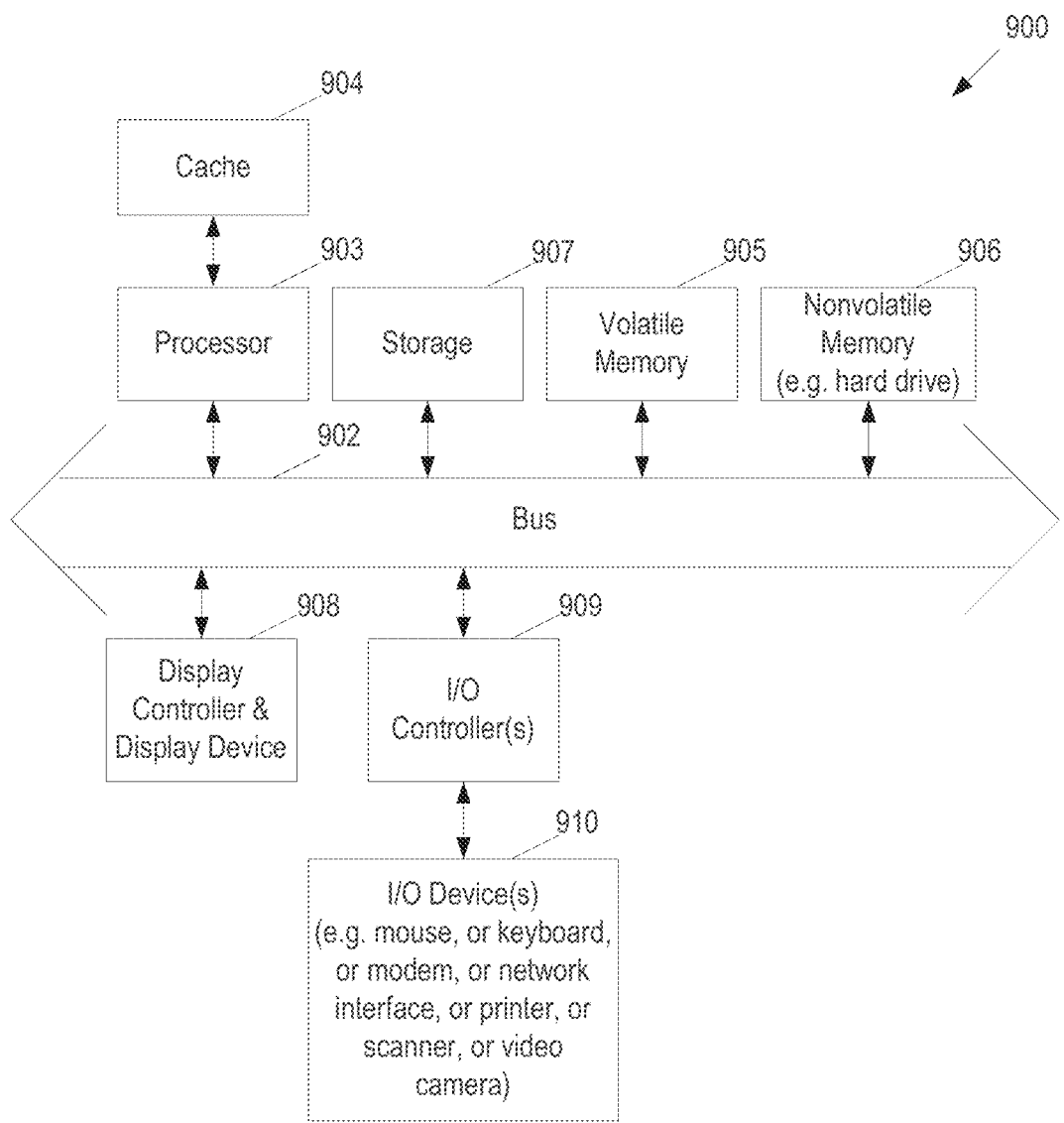
FIG. 9 is a block diagram of one embodiment of a computer system that may be used with the present invention.

FIG. 9 shows one example of a typical computer system or data processing system that may be used with the disclosed embodiments. For example, in one embodiment the processes described with respect to FIGS. 4, 6, and 8 are operational through the example computing system. However, it is noted that while FIG. 9 illustrates various components of a computer system, it is not intended to represent any particular architecture or manner of interconnecting the components but rather provides an example representation of how the components and architecture may be configured. It will also be appreciated that network computers and other data processing systems that have fewer components or perhaps more components may also be used with the disclosed embodiments. The computer system of FIG. 9 may be any computing system capable of performing the described operations.

As shown in FIG. 9, the computer system 900, which is a form of a data processing system, includes a bus 902, which is coupled to one or more microprocessors 903. In one embodiment, computer system 900 includes one or more of a storage device (e.g., ROM) 907, volatile memory (e.g., RAM) 905, and a non-volatile memory (EEPROM, Flash) 906. The microprocessor 903 is coupled to cache memory 904 as shown in the example of FIG. 9. Cache memory 904 may be volatile or non-volatile memory.

The bus 902 interconnects these various components together and in one embodiment interconnects these components 903, 907, 905, and 906 to a display controller and display device 908. The computer system 900 may further include peripheral devices such as input/output (I/O) devices, which may be mice, keyboards, modems, network interfaces, printers, scanners, video cameras and other devices which are well known in the art. Typically, the input/output devices 910 are coupled to the system through input/output controllers 909.

The volatile memory 905 is typically implemented as dynamic RAM (DRAM) which requires power continually in order to refresh or maintain data in the memory. The non-volatile memory 906 is typically a magnetic hard drive, magnetic optical drive, an optical drive, a DVD RAM, a Flash memory, or other type of memory system which maintains data even after power is removed from the system. Typically, the non-volatile memory will also be a random access memory although this is not required.

While FIG. 9 shows that the non-volatile memory is a local device coupled directly to the rest of the components in the data processing system, it will be appreciated that the disclosed embodiments may utilize a non-volatile memory which is remote from the system, such as a network storage device which is coupled to the data processing system through a network interface such as a modem or Ethernet interface.

The bus 902 may include one or more buses connected to each other through various bridges, controllers and/or adapters as is well known in the art. In one embodiment the I/O controller 909 includes a USB (Universal Serial Bus) adapter for controlling USB peripherals, and/or an IEEE-1394 bus adapter for controlling IEEE-1394 peripherals.

The computer system 900 may be implemented as a mobile device, such as a smart phone implementing the customer device described above. The computer system 900 may also be implemented as a server system, such as a system implementing the mobile intelligence API. In one embodiment, instead of a computer system 900 coupled via busses, the system may be implemented in a cloud-based distributed system, in which the various elements interact via a network.

It will be apparent from this description that aspects of the disclosed embodiments may be embodied, at least in part, in software (or computer-readable instructions). That is, the techniques, for example the processes of FIGS. 4, 6, and 8 may be carried out in a computer system or other data processing system in response to its processor, such as a microprocessor, executing sequences of instructions contained in a memory, such as storage device 907, volatile memory 905, non-volatile memory 906, cache 904 or a remote storage device. In various embodiments, hardwired circuitry may be used in combination with software instructions to implement the disclosed embodiments. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as microprocessor 903.

A machine-readable storage medium can be used to store software and data which when executed by a data processing system causes the system to perform various methods of the disclosed embodiments. This executable software and data may be stored in various places including for example storage device 907, volatile memory 905, non-volatile memory 906 and/or cache 904 as shown in FIG. 9. Portions of this software and/or data may be stored in any one of these storage devices.

Thus, a machine-readable storage medium includes any mechanism that stores any information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.).

The detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The detailed description is, therefore, not to be taken in a limiting sense, and the scope of the present invention is defined by the appended claims.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Some portions of the detailed description were presented as procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sending" or "receiving" or "displaying" or "calculating" or "determining" or "multiplying" or "computing" or "identifying" or the like, refer to the action and processes of a computer system, or similar electronic computing device that manipulates and transforms data represented as physical (electronic) quantities within the computer system's registers and memories and other computer readable media into other data similarly represented as physical quantities within the computer system's memories or registers or other such information storage, transmission or display devices.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of providing location information associated with a user to an authorized third party, the method comprising:

receiving location data authorization from the user to allow use of cellular network location data related to a registered mobile device associated with the user;

receiving an information location request rule defined by the authorized third party via an application programming interface (API), the rule defining a condition associated with a location of the user, wherein the authorized third party requests to receive the location information of the user when the condition is met;

accessing an intercarrier system deployed between a home network and a visited network, the intercarrier system configured to enable the registered mobile device to access home data services while roaming in the visited network, wherein the registered mobile device is subscribed to the home network and is configured for roaming in the visited network;

responsive to the registered mobile device registering with the visited network in a foreign country, receiving from the Home Location Register (HLR), by the intercarrier system, an updated information, the updated information selected from the group consisting of signaling data of mobile registration with the visited network and registration updates, wherein the updated HLR information is obtained from the home network;

identifying a current location in which the registered mobile device is roaming based on the updated HLR information;

responsive to determining that the current location of the registered mobile device satisfies the condition set forth by the rule defined by the authorized third party, providing to the authorized third party the location information associated with the current location in which the registered mobile device is roaming; and validating, by the intercarrier system or the authorized third party, a financial transaction associated with the user of the mobile device in response to a determination that the current location of the mobile device matches the location of the financial transaction.

2. The method of claim 1 further comprising:

receiving a customer data authorization from the user to allow using customer data related to the user; and receiving the customer data related to the user from one or more enterprises.

3. The method of claim 1, further comprising:
obtaining local location data selected from the group consisting of: global positioning data, assisted global positioning data, and network triangulation data.

4. The method of claim 3, further comprising determining a set of locations where the user is currently or is likely to visit, by retrieving a transaction history of the user and determining whether the user fits a set of criteria based on the transaction history of the user and the set of locations.

5. The method of claim 4, wherein, responsive to determining that the user fits the set of criteria, sending an offer to the user.

6. The method of claim 1, wherein the authorization to use the cellular network location data is received via the home network or the visited network.

7. The method of claim 1, further comprising receiving, by the intercarrier system, additional data pertaining to the user, the additional data comprising services used, countries visited, networks used, and device information.

8. The method of claim 1, further comprising receiving an information request for validating the current location of the user.

9. A system for providing location information of a user to an authorized third party, the system comprising:
an intercarrier system deployed between a home network and a visited network, the intercarrier system configured to enable a registered mobile device associated with the user to access home data services while roaming in the visited network, wherein the registered mobile device is subscribed to the home network and is configured for roaming in the visited network;
a database in communication with the intercarrier system, the database configured to receive, from the Home Location Register (HLR), updated HLR information, the updated HLR information selected from the group consisting of signaling data of mobile registration with the visited network and registration updates wherein the updated HLR information is obtained from the home network;
an intelligence engine configured to identify a current location in which the registered mobile device is roaming based on the updated HLR information; and
an application programming interface (API) configured to enable the authorized third party to input an information location request rule, the rule defining a condition associated with a location of the user, wherein the authorized third party requests to receive the location information of the user when the condition is met, wherein responsive to determining that the current location of the registered mobile device satisfies the condition set forth by the rule defined by the authorized third party, the location information associated with the current location in which the registered mobile device is roaming is provided to the authorized third party; and
the intercarrier system is further configured to validate a financial transaction associated with the user of the mobile device in response to a determination that the current location of the mobile device matches the location of the financial transaction.

10. The system of claim 9, wherein the system further comprises a customer database to store customer data received from a plurality of enterprises.

11. The system of claim 9, further comprising a privacy manager configured to receive location data authorization for the user to allow the use of national and international cellular network location data related to the registered mobile device.

12. A non-transitory machine-readable medium having executable instructions to cause one or more processing units to perform a method of providing location information associated with a user to an authorized third party, the method comprising:
receiving location data authorization from the user to allow use of cellular network location data related to a registered mobile device associated with the user;
receiving an information location request rule defined by the authorized third party via an application programming interface (API), the rule defining a condition associated with a location of the user, wherein the authorized third party requests to receive the location information of the user when the condition is met;
accessing an intercarrier system deployed between a home network and a visited network, the intercarrier system configured to enable the registered mobile device to access home data services while roaming in the visited network, wherein the registered mobile device is subscribed to the home network and is configured for roaming in the visited network;
responsive to the registered mobile device registering with the visited network in a foreign country, receiving from the Home Location Register (HLR), by the intercarrier system, an updated information, the updated information selected from the group consisting of signaling data of mobile registration with the visited network and registration updates, wherein the updated HLR information is obtained from the home network;
identifying a current location in which the registered mobile device is roaming based on the updated HLR information;
responsive to determining that the current location of the registered mobile device satisfies the condition set forth by the rule defined by the authorized third party, providing to the authorized third party the location information associated with the current location in which the registered mobile device is roaming; and
validating, by the intercarrier system or the authorized third party, a financial transaction associated with the user of the mobile device in response to a determination that the current location of the mobile device matches the location of the financial transaction.

13. The non-transitory machine-readable medium of claim 12, wherein the method further comprises:
receiving a customer data authorization from the user to allow using customer data related to the user; and
receiving customer data related to the user from a plurality of enterprises.

14. The non-transitory machine-readable medium of claim 13, wherein an analysis is performed on the customer data related to the user in order to retrieve information pertaining to the user.

15. The non-transitory machine-readable medium of claim 12, wherein a set of offers is identified based on the current location of the user.

16. The non-transitory machine-readable medium of claim 15, wherein the set of offers is sent to the user.

* * * * *